United States Patent Office 3,190,612
Patented June 22, 1965

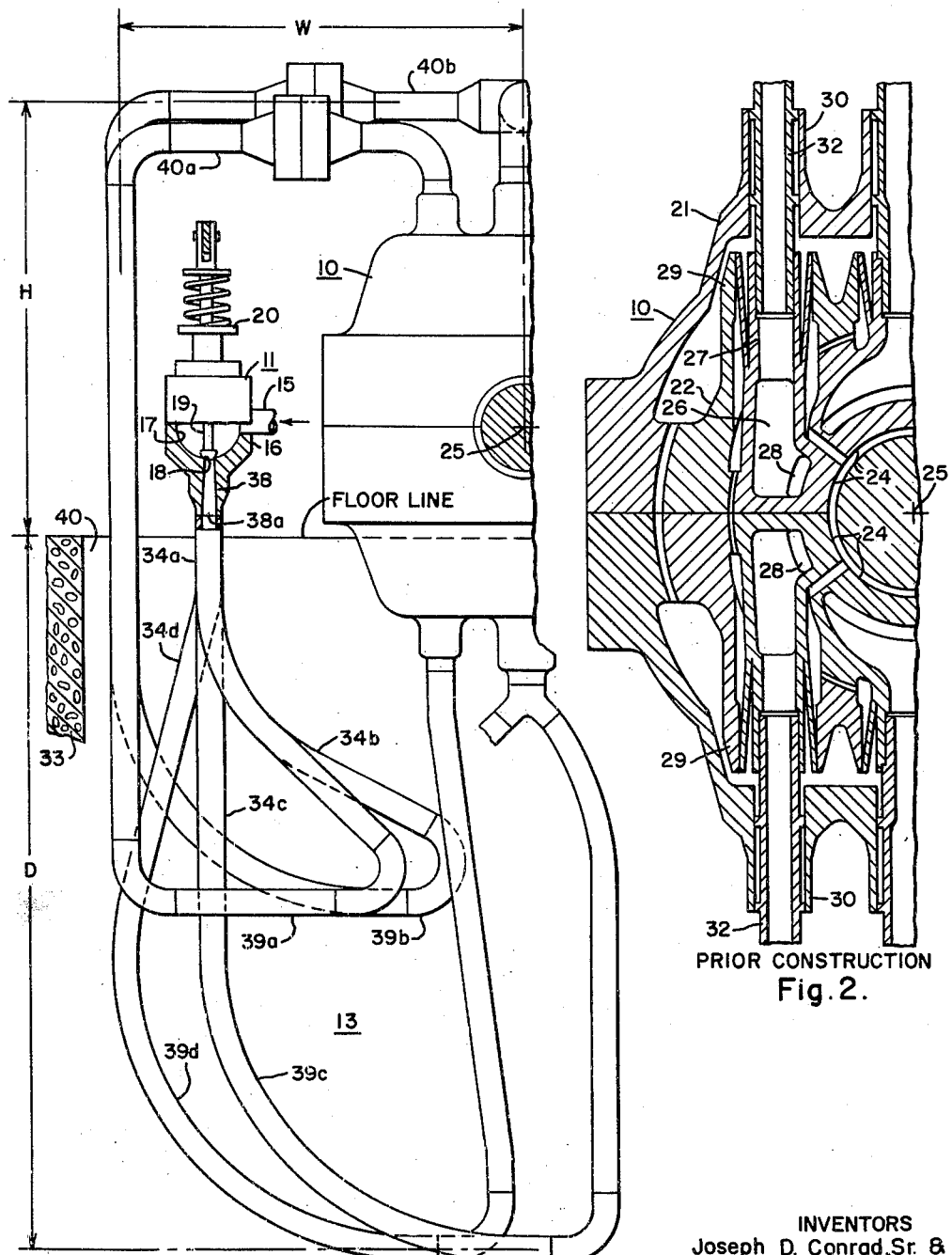

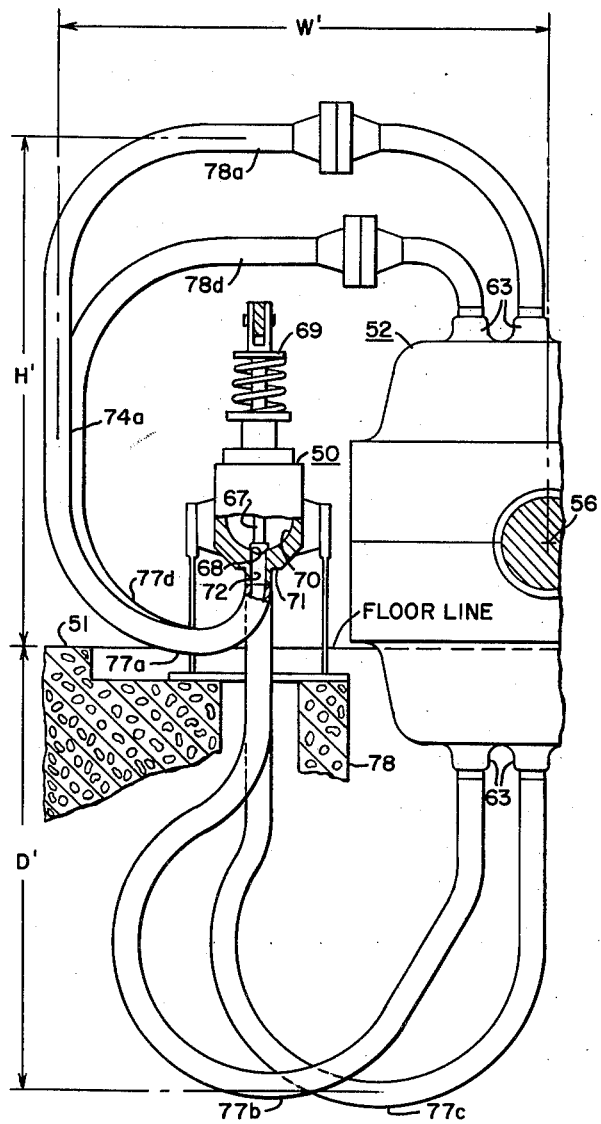
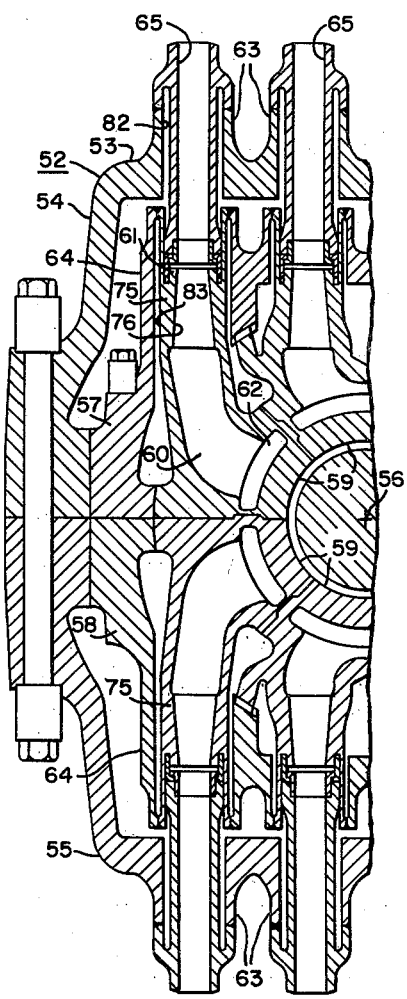
Fig. 3.
Fig. 4.

3,190,612
ELASTIC FLUID FLOW CONTROL APPARATUS
Joseph D. Conrad, Sr., Springfield, and Ozro N. Bryant, Nether Providence Township, Delaware County, Pa., assignors to Westinghouse Electric Corporation, Pittsburgh, Pa., a corporation of Pennsylvania
Filed Mar. 5, 1963, Ser. No. 262,948
5 Claims. (Cl. 253—39)

This invention relates to elastic fluid flow control apparatus, more particularly to apparatus for controlling the flow of steam at high pressure and temperature to a steam turbine, and has for an object to provide improved apparatus of this type.

Another object of the invention is to provide an arrangement of the above type in which the length of steam piping from an anchored steam control valve structure to the turbine is greatly reduced without decrease in flexibility of the piping and without imposing additional stress on the turbine or valve structure during expansion incident to operation.

A further object is to provide an arrangement of the above type in which the internal and external cross-sectional area of the steam piping from the anchored valve structure to the turbine is decreased without increase in total pressure loss.

Yet another object is to provide an arrangement in which the steam conducting piping from an anchored control valve structure to an anchored turbine is of reduced length and cross-sectional flow area without comprising flow efficiency and flexibility, yet resulting in cost reduction in manufacturing, material and installation.

Briefly, in accordance with the invention, the length of the expansion loops in the piping, for conducting steam at high pressure and temperature from an anchored valve structure to the inlet of an anchored turbine, is greatly reduced by employing piping of smaller internal cross-sectional flow area than heretofore provided by the assignee of this invention.

The above is attained by proportioning the valve port and the movable valve member in the rigidly anchored control valve structure in a manner to cause the high pressure steam to flow therethrough at high velocity with attendant significant reduction in original pressure. This steam is then directed through metal piping, of substantially the same or only slightly greater internal cross-sectional flow area than that of the valve port, into the casing of the steam turbine. After entry into the turbine casing, the steam flow is directed through a diffuser structure to recover the major portion of its original pressure, by conversion of its velocity into pressure, and thence employed to motivate the turbine.

Since the metal piping conducts the steam at high velocity, the pressure drop losses per unit length of piping are obviously greater than heretofore deemed desirable. However, since the piping is of smaller cross-sectional area, it is also inherently of greater flexibility per unit length. Advantage is taken of this latter characteristic to shorten the lengths of the expansion loops in the piping to such a large degree that the resultant total pressure drop loss in the piping system is substantially the same (or even less) than in the piping system heretofore required, without increasing the stresses on the turbine during operation.

This arrangement provides greatly decreased costs in the piping, manufacture and installation, and also provides a more compact physical piping arrangement that reduces the space requirements for the turbine installation.

The above and other objects are effected by the invention as will be apparent from the following description and claims, taken in connection with the accompanying drawings, forming a part of this application, in which:

FIGURE 1 is a vertical elevational view of apparatus including a steam turbine and steam control valve structure, formed in accordance with a prior construction;

FIG. 2 is an enlarged sectional view of the turbine shown in FIG. 1;

FIG. 3 is a vertical elevational view of apparatus including a steam turbine and steam control valve structure, formed in accordance with the invention and taken on the same scale as FIG. 1; and FIG. 4 is an enlarged sectional view of the steam turbine shown in FIG. 3.

Referring to the drawings in detail, in FIGS. 1 and 2 there is shown a prior construction of apparatus including a steam turbine 10, a control valve structure 11 and steam piping generally indicated 13 connecting the valve structure 11 to the steam turbine 10 for conducting steam thereto and controlling the same from a suitable supply (not shown) delivered to the valve structure 11 by a suitable conduit 15. Only the left-hand half portion of the apparatus is illustrated, for simplicity, since the right-hand half portion may be substantially a mirror image of the portion illustrated. This prior construction has heretofore been provided by the assignee of this invention, and has been found highly suitable and reliable.

Referring more particularly to FIG. 1, the valve structure 11 may be of the multiple valve type and includes a valve body 16 defining a steam chest 17 and having a plurality of valve ports 18 controlled by movable valve members 19. Only one port 18 and associated valve member 19 has been illustrated and will be described, since the other ports and valve members may be substantially similar thereto. The valve member 19 is axially movable for regulating steam flow from the steam chest 17 through the associated port 18, as well known in the art. As customary, the valve structure 11 is of the servo motor actuated type and is controlled by a suitable servo motor mechanism 20 for controlling the positions of the movable valve members 19 to vary the steam flow to the turbine 10, as required to sustain varying load thereon.

Referring to FIG. 2, the steam turbine 10 has an external shell or casing 21 formed in upper and lower halves connected to each other along a central horizontal plane, and an internal shell or casing structure 22 disposed withing the external casing 21 and also divided into upper and lower halves along a central horizontal plane. The internal casing structure 22 is provided with an annular row of separately formed nozzle boxes 24 of arcuate shape, arranged concentrically with the central axis 25 of the turbine. Each of the nozzle boxes 24 defines a nozzle chamber 26 having a steam inlet 27 of generally cylindrical shape and a steam outlet 28 of elongated arcuate cross-sectional shape. Accordingly, steam is admitted through the inlets 27 to each of the nozzle chambers 26 and directed through the outlets 28 to provide a motive effect upon the rotor blades (not shown) of the turbine 10.

Since the turbine 10 is employed at relatively high temperature values, the inlets 27 of the nozzle boxes are connected to suitable neck portions 29 provided in the inner casing structure 22, and steam is directed through the outer casing structure 21 through a plurality of inlet neck portions 30 to the inlets of the nozzle boxes by tubular transition members 32 of generally uniform internal cross-sectional area. The members 32 are connected at one end to the neck portions 30 and slidably received at the other end in the inlets 27 of the nozzle boxes 24. Accordingly, as well known in the art, during operation, the internal casing 22 is free to expand relative to the outer casing 21 and such expansion is accommodated by the tubular members 32. Also, since the nozzle boxes 24 are formed separately, they are free to move relative to each other during expansion incident to such operation.

In the above described structure, the valve structure 11 is rigidly anchored to a foundation 33 in any suitable manner (not shown) in a position above the floor line and, in a similar manner, the turbine 10 is also anchored to the foundation 33 in a position such that the major portion extends above the floor line while a lesser portion extends below the floor line. Accordingly, the valve structure 11 and the turbine 10 are relatively immovable with respect to each other and the foundation.

Since a plurality of nozzle boxes 24 are employed, the nozzle boxes in the upper casing half portion are fed by steam directed thereto through the neck portions 30 disposed in the upper half of the outer casing 21 while the nozzle boxes in the lower casing half portion are fed by steam directed thereto through the neck portions 30 provided in the lower half of the outer casing.

Each of the valve ports 18 is connected to an associated nozzle box 24 by individual metal pipes 34a, 34b, 34c and 34d connected at one end to the valve body 16 and at the other end to the associated transition member 32 and neck 30.

To minimize the force exerted by the servo motor 20 required to open the valves 19, the cross-sectional area of the valves and their associated ports 18 is minimized. However, this arrangement causes the steam flow through the valves to attain high velocity, even when fully opened, with attendant reduction in pressure. Accordingly, immediately downstream of each of the valve ports 18 and in communication therewith, there is provided a diffuser structure 38 having a smoothly diverging flow passageway, to convert a portion of the steam velocity to pressure before delivery by the pipes 34a, b, c and d, to the turbine 10. The steam flow at this lower velocity and higher pressure is conducted through the pipes to the nozzle chambers 26 at substantially the optimum value for motivating the turbine. However, since the velocity is reduced at the valve structure 11, the internal diameter of the piping 13 is maintained at substantially the same diameter as the outlet 38a of the diffuser structure 38 and the increase in pressure also requires that the thickness of wall in the piping be sufficient to withstand such internal steam pressure. Accordingly, since the necessarily large diameter piping required is substantially of low flexibility per unit length, a plurality of expansion pipe loops 39a and 40a are provided in the piping 34a to assume the expansive stresses due to the heating effect of the steam during operation and to provide sufficient flexibility to the piping to minimize the transmission of such stresses to the valve structure 11 and/or to the turbine casing 21. It will be noted that the expansion loop 39a extends downwardly from the floor line while the expansion loop 40a extends upwardly above the floor line. To accommodate the lower expansion loop 39a, the foundation 33 is provided with a cavity 40 to permit the installation of the lower expansion piping loops.

The pipes 34b, c and d, from the other valve members (not shown) are also connected in the same manner to the turbine casing 21, as indicated by the expansion loops 39b and 40b in pipe 34b, and expansion loops 39c and 39d in the pipes 34c and d, respectively.

Since the right half of the turbine 10 is also provided with valve structure and piping structure similar to that shown and described in conjunction with FIG. 1, it will be seen that considerable length of piping is required to conduct the steam from the valve structure to the turbine.

With the above prior construction, by way of example the depth D of the longest bottom loops 39c and d is on the order of about 17½ feet while the height H of the longest upper loop 40b is on the order of about 10¼ feet. Also, the maximum width W of the loops is on the order of about 9½ feet. It will be noted that the depth and width of the foundation cavity 40 must be sufficient to accommodate the maximum width and depth of the lower loops.

In accordance with the invention, as illustrated in FIGS. 3 and 4, it will be seen that there is provided improved apparatus including a valve structure 50 suitably anchored to a concrete foundation or base 51 and disposed adjacent a steam turbine 52 which in turn is also suitably anchored to the foundation 51. Here again only the left half portion of the apparatus has been illustrated, it being understood that the right half may be substantially a mirror image thereof. That is, the right half of the turbine 52 may be provided with steam controlled by a valve structure similar to the valve structure 50 illustrated in FIG. 3.

Referring to FIG. 4, the steam turbine 52 is provided with an outer casing or shell 53 divided into upper and lower halves 54 and 55 along a horizontal plane extending through the central axis 56 of the turbine. Within the outer casing there is also provided an inner casing divided into upper and lower horizontally divided halves 57 and 58. The upper and lower halves 54 and 55 of the outer casing may be substantially identical, and similarly, the upper and lower halves 57 and 58 of the inner casing structure may be substantially identical. The inner casing is provided with an annular array of separately formed nozzle boxes 59, each defining a nozzle chamber 60 having an inlet portion 61 of substantially circular cross-section and an outlet portion 62 of substantially arcuate cross-section. The nozzle boxes are arranged in such a manner that the outlets 62 thereof jointly form an annular outlet to direct steam from the nozzle boxes 59 to the rotor blades (not shown) to motivate the turbine.

The outer casing 53 is provided with a plurality of outwardly extending steam inlet neck portions 63, while the inner turbine casing has a similar plurality of steam inlet neck portions 64. A tubular transition member 65 of substantially uniform internal cross-sectional shape is connected to each neck portion 63 and is slidably received in an associated neck portion 64 of the inner casing in communication with the inlet 61 of the associated nozzle box 59.

The valve structure 50, as illustrated, is employed to control flow of steam from a suitable supply (not shown) to the individual nozzle chambers 59 associated with the left half of the steam turbine shown in FIG. 4 and, accordingly, it is provided with a plurality of movable valve members 67 associated with a plurality of valve ports 68 (only one set of valve members 67 and ports 68 has been illustrated). Also, the valve structure 50 may be operated by a suitable servo motor structure 69 in a manner to individually control the flow of steam to the nozzle boxes 59, as previously described in conjunction with the prior construction shown in FIGS. 1 and 2.

Each movable valve member 67 and associated port 68 is of relatively small cross-sectional area to control flow of steam from the steam chest 70 formed in the valve body 71 at high velocity and with attendant significant reduction in the pressure of the steam, thereby facilitating movement of the valve member 67 in opening direction by the servo motor structure 69. The steam flow passage portion 72 downstream of the valve port 68 is of substantially uniform cross-sectional area so that the steam flows therethrough without modification of its high velocity. The steam is directed from the passage portion 72 by a piping structure 74a to the associated inlet neck portion 64 in the turbine and thence to the nozzle box 59 associated therewith. The piping is of uniform internal cross-sectional flow area substantially equal to the cross-sectional flow area of the flow passage portion 72. Hence, the steam flow through the piping 74a is maintained at high velocity and at a lower pressure than the prior construction, and is admitted to the nozzle box 59 at substantially the same high velocity and reduced pressure.

The inlet portion 61 of the nozzle box 59 is provided with a fluid diffuser portion 75 defining an internal diffusing passageway 76 which diverges smoothly in downstream direction to afford a passageway of gradually increasing cross-sectional area for the steam. Accordingly, as the steam flows therethrough it is diffused, that is, the high velocity is reduced sufficiently to recover substantially the initial pressure of the steam in the steam chest 70 of the valve structure 50. The steam is then directed through the nozzle box outlet 62 at substantially the proper velocity and pressure for optimum motivation of the turbine rotor (not shown).

To provide for thermal elongation and other expansion during operation, the piping 74a is provided with a lower expansion loop portion 77a and an upper expansion loop portion 78a. Hence, the expansion loops 77a and 78a permit the elongation in the piping 74a to be taken up by the inherent flexibility of the piping without unduly stressing the body of the valve 50 and/or the turbine 52.

The piping 74a is of relatively small external cross-sectional area, as well as internal cross-sectional area. Therefore, it is inherently more flexible than the larger piping 13 employed in the prior construction, and the lengths of the loops 77a and 78a are considerably shorter while still maintaining the same overall flexibility as that illustrated in FIGS. 1 and 2 with the prior construction.

It will be noted that two of the other valves (not shown) employ lower expansion loops 77b and 77c extending below the floor line and the remaining valve (not shown) employs a lower expansion loop 77d and an upper expansion loop 78d extending above the floor line. By way of example, the height H' of the maximum upper loop 78a may be on the order of about 11 feet 7 inches, while the depth D' of the longest lower loop 77c may be on the order of about 10⅙ feet below the floor line. Also, the maximum horizontal width W' of the piping loops may be on the order of about 10 feet 11 inches.

The reduced internal cross-sectional area of the piping is effective to create a larger pressure drop loss per unit of length of the piping. However, the total length of the piping 74a, b, c and d required to complete the expansion loops and connections from the valve body to the turbine is considerably reduced over the prior construction, so that the total loss in the piping system due to the substantially higher velocity is considerably minimized and is about the same or less than the pressure loss attained with the prior construction.

The following table gives a compression between the various values attained and employed with the old construction shown in FIGS. 1 and 2 and the arrangement provided in accordance with the invention.

| | Prior Construction | Present Invention |
|---|---|---|
| Steam Velocity at the valve port (ft./sec.) | 508 | 405 |
| Pipe O.D. (inches) | 8⅝ | 6⅝ |
| Pipe I.D. (inches) | 4.8 | 4.2 |
| Steam Velocity in the Piping (ft./sec.) | 215 | 280 |
| Velocity at the Turbine Nozzle Box Outltes (ft./sec.) | 215 | 155 |
| Total length of piping required (ft.) | 280 | 160 |
| Max. length of lower expansion loop (ft.) | 17½ | 10⅙ |
| Total pressure loss in valve, piping and diffuser, percent | 4 | 4 |

From the above it will be seen that with the invention, the velocity of the steam through the piping is increased from a relatively low value of 215 feet per second to a considerably higher value of 280 feet per second. However, the steam velocity is reduced during flow through the diffuser 75 in the nozzle box 59 to a velocity of about 155 feet per second while, in the prior construction the pipe velocity of 215 feet per second is maintained so that it is admitted to the nozzle box at substantially the same velocity.

The most important feature brought out in the above list of figures is the considerable reduction in length of piping required with the invention. Whereas, with the prior construction the required length of pipe was about 280 feet, with the invention the length of pipe required is only about 160 feet. Hence, even though the losses with the smaller diameter piping 74a, b, c and d are larger per unit of length of the piping, since about 43% less piping is required, the total losses in the smaller diameter piping, valve and diffuser system are substantially the same as with the prior construction (about 4%) and in no event should they exceed the losses attained with such prior construction.

The outer and inner turbine casings must be designed to adequately maintain the motive steam supplied thereto for operation and accordingly are termed "pressure vessels." In pressure vessel design, it is highly important to minimize the size of apertures formed therein. Since the piping is of relatively small external cross-sectional area, the inlet necks 63 and 64 in the turbine casings may be of smaller diameter than heretofore to accommodate such smaller diameter piping. Accordingly, the apertures 82 and 83 forming the internal wall surfaces of the necks 63 and 64 respectively, may be of smaller diameter than heretofore, thereby enhancing the pressure sustaining chracteristics of the turbine casing structure.

Also, since the smaller diameter piping 74 is of less weight than that heretofore employed, it is less costly per unit of length than the larger diameter piping, and since less length is required in the smaller diameter piping 74 it will be seen that this entails considerable reduction in the cost of the piping required.

In addition to the above, since the depth D' of the expansion loops 77b and c has been considerable shortened, the depth of the cavity 78 in the foundation 51 requires less excavation than heretofore, thereby permitting attendant economies in the provision of the foundation and the mounting of the turbine 52 and the valve structure 50 thereon.

A further advantage resides in the more compact arrangement provided with this invention, as will be apparent (from a comparison of FIGS. 1 and 3) that the lesser lengths of piping required are conducive to a more compact vertical aspect.

There may be occasions, when the velocity of the steam directed through the valve port 68 may be slightly higher than desired for optimum operation. In such situations, it may be desirable to form the flow passage portion 72 with a slightly diverging aspect in downstream direction to diffuse a relatively small portion of the velocity and convert the velocity to a slightly higher pressure than would otherwise be attained. This would require only slightly larger diameter piping and could be employed to properly provide the optimum flow characteristics to the steam while still maintaining the advantages of this invention. In any event, the major portion (about 90%) of the diffusion is attained in the diffusion passageway 76 in the turbine, so that the steam flows through the piping at considerably higher velocities than with the prior construction.

It will now be seen that the invention provides a highly improved arrangement which is simple yet effective to reduce the cost of the piping for conducting the steam from the control valve structure to the turbine without decreasing the overall flexibility of the piping and without imposing additional stresses on the turbine or on the valve structure during expansion thereof incident to operation.

Although only one embodiment of the invention has been shown, it will be obvious to those skilled in the art that it is not so limited, but is susceptible of various other changes and modifications without departing from the spirit thereof.

We claim as our invention:
1. Steam flow control apparatus comprising
   a steam turbine, a foundation upon which said turbine is rigidly mounted, said steam turbine including an inner and an outer casing, a nozzle box disposed within said inner casing, said nozzle box defining a nozzle chamber having an inlet of circular cross-section and an outlet of arcuate shape, tubular structure of substantially uniform cross-sectional flow area extending through said outer casing and said inner casing and received in said nozzle box inlet, said nozzle box defining a diffusion passageway interposed between said nozzle box inlet and said nozzle chamber;

a steam control valve structure rigidly mounted on said foundation, said valve structure including
a valve body having a port,
conduit means for admitting steam at a high initial pressure to said valve body, and
a movable valve member associated with said port for controlling flow of steam from said steam chest, said valve member and said port having a cross-sectional area of sufficiently small value to cause steam to flow therethrough at a high initial velocity with attendant initial pressure drop, metal piping providing a flow passage from said valve port to said tubular structure for conducting steam from said valve body to said nozzle chamber, said piping being rigidly connected to said valve body at one end and to said outer casing at its other end and having a substantially uniform cross-sectional flow area substantially equal to that of said tubular structure, whereby steam is conducted through said piping and tubular structure into said outer and inner casings at substantially the initial velocity;

said piping including at least one expansion loop; and said diffuser means having a smoothly diverging passageway to convert the high velocity to pressure and recover the major portion of said initial pressure drop.

2. Steam flow control apparatus comprising
a steam turbine,
said steam turbine including a casing,
means defining a nozzle chamber disposed within said casing,
tubular structure of substantially uniform cross-sectional flow area extending into said casing, and
means defining a diffuser interposed between said tubular structure and said nozzle chamber;
a steam control valve structure,
said valve structure including a valve body having a valve port,
means for admitting steam at a high initial pressure to said valve body, and
a movable valve member associated with said port for controlling flow of steam from said valve body,
said valve member and said port being formed in a manner to cause steam to flow therethrough at a high initial velocity with attendant initial pressure drop,
metal piping connecting said port to said tubular structure for conducting steam from said valve body to said turbine,
said piping having a substantially uniform cross-sectional flow area substantially equal to that of said tubular structure,
whereby steam is conducted through said piping and tubular structure into said casing at substantially the initial velocity,
said diffuser means being formed in a manner to convert the high velocity to pressure and recover the major portion of said initial pressure drop,
said control valve structure is disposed adjacent said turbine, said piping is arranged to define at least one expansion loop, and
said expansion loop is effective to permit thermal expansion and elongation of the piping without imposing substantial stresses on said valve structure and said casing.

3. Steam flow control apparatus comprising a steam turbine,
said steam turbine including a casing,
means defining a nozzle chamber disposed within said casing,
tubular structure of substantially uniform cross-sectional flow area extending into said casing, and
means defining a diffuser interposed between said tubular structure and said nozzle chamber;
a steam control valve structure,
said valve structure including a valve body having a valve port,
means for admitting steam at a high initial pressure to said valve body, and
a movable valve member associated with said port for controlling flow of steam from said valve body,
said valve member and said port being formed in a manner to cause steam to flow therethrough at a high initial velocity with attendant initial pressure drop,
metal piping connecting said port to said tubular structure for conducting steam from said valve body to said turbine,
said piping having a substantially uniform cross-sectional flow area substantially equal to that of said tubular structure,
whereby steam is conducted through said piping and tubular structure into said casing at substantially the initial velocity,
said diffuser means being formed in a manner to convert the high velocity to pressure and recover the major portion of said initial pressure drop,
means for rigidly anchornig said control valve structure adjacent said turbine,
said piping being arranged to define at least one flexible expansion loop, and
said expansion loop being effective to permit thermal elongation of the piping without imposing substantial stresses on said valve structure and said casing.

4. Steam flow control apparatus comprising a steam turbine,
said steam turbine including a casing,
means defining a nozzle chamber disposed within said casing,
tubular structure of substantially uniform cross-sectional flow area extending into said casing, and
means defining a steam diffuser interposed between said tubular structure and said nozzle chamber;
a steam control valve structure,
said valve structure including a valve body defining a steam chest having a valve port,
means for admitting steam at a high initial pressure to said steam chest, and
an axially movable valve member received in said steam chest and associated with said port for controlling flow of steam from said steam chest,
said valve member and said port being of small cross-sectional area to cause steam to flow therethrough at a high initial velocity with attendant initial pressure drop,
metal piping rigidly connected at one ed to said valve body and at its other end to said tubular structure for conducting steam from said valve port to said turbine,
said piping having a substantially uniform cross-sectional flow area substantially equal to that of said valve port,
whereby steam is conducted through said piping into said casing at substantially the initial velocity,
said diffuser means being formed in a manner to convert the high velocity to pressure and recover the major portion of said initial pressure drop, said control valve structure is immovably anchored adjacent said turbine, said piping is arranged to define at least one expansion loop, and said expansion loop is effective to permit thermal expansion and elongation of the piping without imposing substantial stresses on said valve structure and said casing.

5. Steam flow control apparatus comprising a steam turbine, said steam turbine including a casing, means defining a nozzle chamber disposed within said casing, tubular structure of substantially uniform cross-sectional flow area extending into said casing, and means defining a steam diffuser interposed between said tubular structure and said nozzle chamber;

a steam control valve structure, said valve structure including a valve body defining a steam chest having a valve port, means for admitting steam at a high initial pressure to said steam chest, an axially movable valve member received in said steam chest and associated with said port for controlling flow of steam from said steam chest, means for rigidly supporting said control valve structure and said turbine, said piping being arranged to define at least one flexible expansion loop, and said expansion loop being effective to permit thermal elongation of the piping without imposing substantial stresses on said valve structure and said casing.

References Cited by the Examiner
UNITED STATES PATENTS

| | | | |
|---|---|---|---|
| 2,147,874 | 2/39 | Zetterquest | 253—39 |
| 2,545,187 | 3/51 | Anderson | 253—39 |
| 2,815,645 | 12/57 | Downs | 253—39 |

FOREIGN PATENTS

| | | |
|---|---|---|
| 813,330 | 5/59 | Great Britain. |
| 912,520 | 12/62 | Great Britain. |

JOSEPH H. BRANSON, Jr, *Primary Examiner.*